Patented Apr. 4, 1944

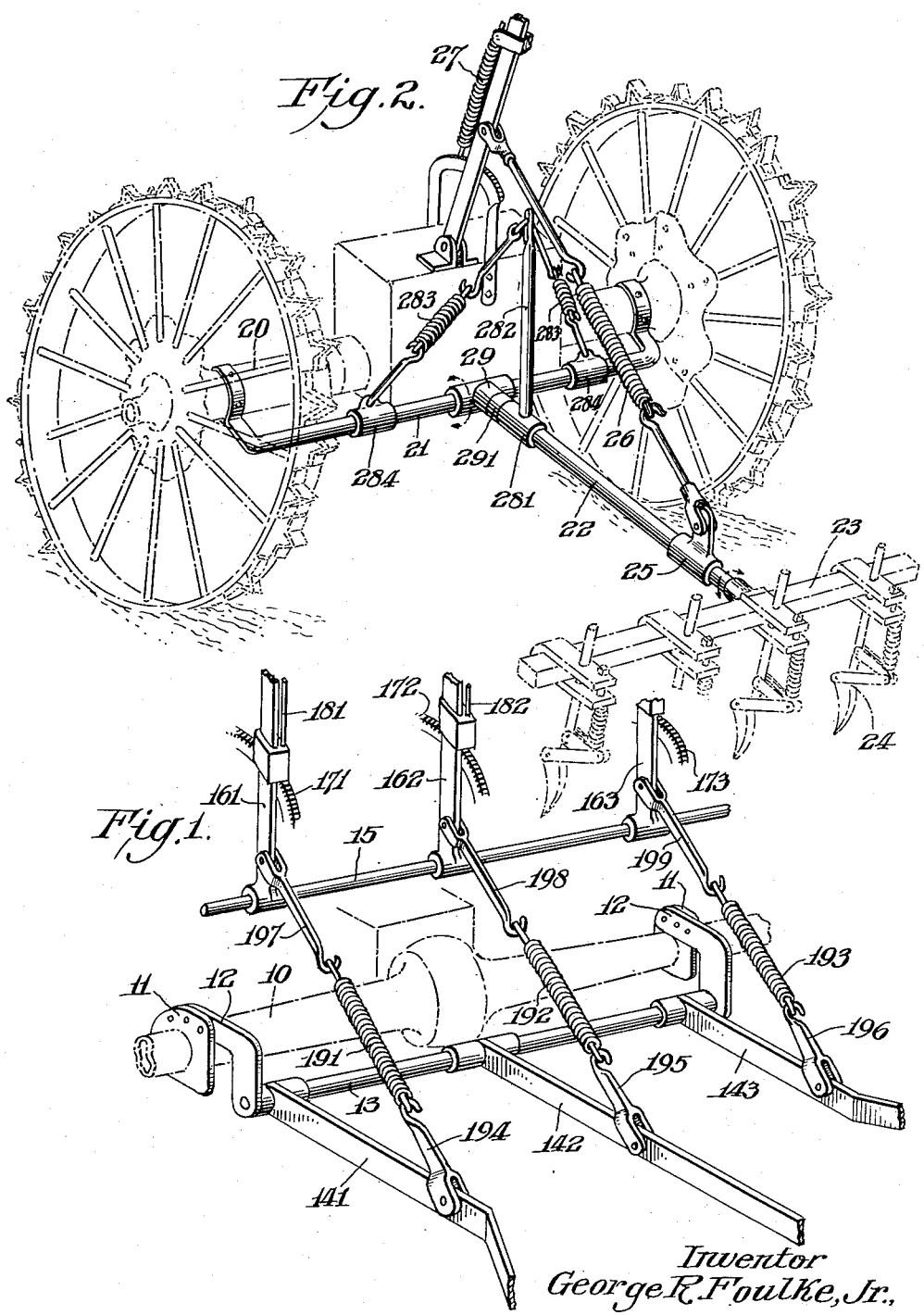

2,345,741

UNITED STATES PATENT OFFICE 2,345,741

TRACTOR CULTIVATOR

George R. Foulke, Jr., Winnabow, N. C.

Application March 20, 1941, Serial No. 384,302

4 Claims. (Cl. 97—47)

This invention relates to the cultivation of the earth by mechanical power. In particular it relates to a tractor-powered cultivator.

The production of crops, so far as the handling of the soil is concerned, is divided today, as it has been since the earliest times, into four distinct types of work: breaking the soil, called plowing; preparing the plowed soil for planting, called preparation and involving operations such as rolling or harrowing; placing the seed in the soil, called planting; and maintaining the soil about the growing crop in the condition best adapted to the production of a good crop, called cultivating. This invention relates to cultivating.

The instruments used in the four divisions of soil working differ specifically from one another. Plows are designed to break up the soil, overturn it, and uproot all things that grow in it. Harrowing is designed to pulverize and level the soil, and complete the destruction of plants, grass and the like, commenced by the plowing.

Cultivating is essential to the profitable production of any crop, such as corn, cotton, tobacco, soy beans, field peas, and peanuts, which grow in rows, and has as its general object to clear all growth, such as grass and weeds, which would use the plant food of the crop; to minimize the evaporation of the water from the soil by breaking the surface crust, formed by rain and sun, which increases evaporation by capillary flow; to form a sponge capable of absorbing and retaining rain water; and to move soil from surface points somewhat distant from the crop row up to and even across the row between the growing plants, whereby to protect the roots of the plants from the heat of the sun, to provide the roots with more plant food and to provide better drainage close to the plants.

At present much cultivating is done by tractor-drawn cultivators which are closely related one to another so far as the scarifying tools are concerned and also with respect to the principles involved in mounting the cultivators on the tractors. It is the general principle adopted in all tractor-drawn cultivators now on the market that the earth-working tools must be thrust down into the ground. This thrust is obtained in general by mounting an adjustable lever on the tractor, which is attached to the frame of the cultivator by a rod so that the thrust on the cultivator frame can be increased by altering the adjustment of the levers. In several instances the rod which transmits the thrust of the lever to the cultivator frame passes loosely through the frame, the actual thrust being imparted by a spring which is kept under compression. By this device the amount of the thrust is not normally less than with a rigid connection but some flexibility is imparted to the rig. Using a two-row rig, and operating at the maximum speed which can be attained without uprooting plants or burying them under excessive earth flow from the tools, that type of tractor-drawn cultivator has a maximum speed of about three miles per hour in the soil of my plantation.

Although the speed of the existing type of tractor-drawn cultivator is greater, it has not supplanted the walking cultivator, which cultivator, drawn by a horse or its equivalent, is guided by a man, and the reasons in general are these: Tractor-drawn cultivators do not adjust themselves to meet varying conditions of levelness and soil consistency as such variations occur; the conditions of the terrain are immediately apparent to the man working behind a cultivator, but are not so apparent to the man who rides the tractor. Even when changes in soil and conditions of levelness are observed by the operator of the tractor, he can but seldom manipulate his controls with sufficient speed to care for one gang of cultivators to say nothing of more; in actual fact manual adjustment from the position of the tractor driver of the gangs which follow him is apparently impossible. The results of these facts are that the operator cannot maintain both satisfactory speed and an even quality of work with respect to depth of cultivation, uniformity of earth flow, and close proximity of cultivation to the row of plants.

It is an object of this invention to facilitate cultivation by providing a tractor-cultivator combination of improved type, increased capacity and greater efficiency. Other objects of the invention will be in part apparent and in part hereinafter disclosed.

The objects of the invention are accomplished, generally speaking, by a tractor-cultivator combination in which the cultivators are drawn or pushed by the tractor, but in which a new principle, that of resilient suspension of the cultivator rig for the tractor, is employed. In the tractor-cultivators now known it is the universal practice to thrust the teeth of the cultivator into the ground. It is my discovery that the principle of driving the cultivator teeth into the ground is wrong and that great improvements are secured by suspending the cultivator resiliently from the tractor.

In the accompanying drawing the invention, and a modification thereof, are illustrated. Like numbers refer to like parts.

In the drawing Figure 1 is a view of the rear axle of the tractor and the frame or bars of the cultivator showing a satisfactory form of resilient suspension; Figure 2 is a resilient suspension cultivator-tractor combination providing for lateral as well as vertical resilience.

Referring to the numerals of the drawing, 10 is the rear axle of the tractor; 11—11 are attached plates secured to the rear axle; 12—12 are angle irons attached, as by bolting, to the plates 11; 13 is a shaft mounted in the ends of the plates 12; 141—142—143 are tractor frames or bars pivotally mounted on the shaft 13; 15 is a shaft mounted on the tractor; 161—162—163 are levers pivotally mounted on the shaft 15; 171—172—173 are ratchets mounted on the tractor; 181—182—183 (not shown) are ratchet locks of standard construction mounted on the levers 161—162—163 and making operative contact with the segments 171—172—173, respectively, so that the position of the levers 161—162—163 may be adjusted by the operator of the tractor; 191—192—193 are springs which are connected to bars 141—142—143 by pivoted hooks 194—195—196, respectively, and to the said levers by hooks 197—198—199, respectively. The number of levers and suspension connections used is variable to suit conditions.

From the foregoing description it is seen that in my invention the tractor has means for drawing the cultivators and adjustable means for resiliently suspending them. It is my discovery that no other connections are necessary and that in particular it is unnecessary to force the tools into the ground.

In changing from a very light to a very heavy rig, or vice versa, it is sometimes advisable, in order to secure optimum results, to change the springs, using springs of greater or less power as the case may be. In changing from a heavy to a light rig one may sometimes add weights to the rig to balance excess spring pull.

In Figure 2, 20 is the rear axle of a tractor; 21 is a shaft corresponding to 13 of Figure 1; 22 is a cultivator arm or frame pivoted to the shaft 21; 23 is a cultivator tool bar rigidly attached to the bar 22; 24 are earth-working tools diagrammatically illustrated as attached to the arm 22; 25 is a sleeve rigidly attached to the bar 22; 26 is the spring-suspension of a type similar to that which is hereinabove described; 27 is a helper spring to aid the operator in handling the lever; 281 is a sleeve rigidly attached to the arm 22; 282 is a post rising vertically from and attached to the sleeve 281; 283—283 are springs attached to the post 282 and to sleeves 284—284 rigidly attached to shaft 21; 29 is a sleeve mounted to turn about shaft 21; the arm 22 is mounted for rotation in a sleeve 29 projecting rearwardly; the shaft 22 has a head within sleeve 291 which is screw-threaded onto the rearwardly projecting sleeve 29. There is at 29, consequently, a universal joint whose vertical motion is controlled by the weight of the cultivator and the resilient suspension thereof, and whose horizontal turning is controlled by the springs 283.

It might be said that, by my invention, I weigh the cultivator against the character of the soil. That being so, it might naturally be assumed to be necessary to increase the weight of the cultivator parts in order to compensate for the lack of means to thrust the cultivator tools into the soil. In fact, that is not so. It is a part of my discovery that, by using my resilient suspension, the weight of the cultivator parts may be greatly reduced, as much as 50% in some instances and generally by as much as 20%.

It is also my discovery that this lighter equipment stands up better, has fewer bends and fewer breaks than the heavier equipment needed for old style suspensions, even under more severe conditions of use.

The great superiority of my tractor-cultivator over the types which are now available is particularly demonstrated by this fact, that using the standard high quality rig put out by one of the country's largest and best known manufacturers, I found that the maximum permissible sped of cultivation using a two-row cultivator, and having due regard to the depth of cultivation, proximity to the row of plants, earth flow before the cultivating tools and character of the terrain and soil so that an excellent job of cultivating was accomplished, the best speed was about three miles per hour. Using a two-row tractor-cultivator rig made according to my invention, I discovered that a much greater average speed, in the neighborhood of ten miles an hour, could be obtained with superior results. A special high speed gearing had to be installed to let the tractor travel at the speed obtainable with my rig. It was possible to cultivate closer to the rows, more evenly as to depth, with less regard for the character of the terrain and the condition of the soil, with less manipulation of the controls, with fewer bends and breakages of the parts, and with a lighter cultivator.

Many modifications of my invention are possible: In theory it is possible to mount the cultivator upon a carriage to follow the tractor, but in actual practice that its not an improvement, the best results being obtained in actual combination with the tractor.

As many apparently widely different embodiments of this invention may be made without departing from the spirit and scope thereof, it is to be understood that I do not limit myself to the specific embodiments thereof except as defined in the appended claims.

I claim:

1. In combination a tractor, a frame rigid with the rear axle of said tractor, a horizontal transverse pivot on said frame, a sleeve mounted on the said pivot, a bearing on said sleeve, a cultivator bar rotatably mounted in said bearing, a post attached to said bar, springs attached to said post and operably to said tractor on either side thereof, cultivating tools operably and adjustably attached to said cultivator bar, and means to weigh the cultivator rig against the character of the soil comprising an adjustable spring mounted on the tractor.

2. In combination a tractor, a frame rigid therewith, a pivot on said frame, a sleeve mounted on the said pivot, a bearing on said sleeve, a cultivator bar rotatably mounted in said bearing, resilient means to limit the rotation of the said bar, cultivating tools operably and adjustably attached to said bar, and means to weigh the cultivator rig against the character of the soil comprising an adjustable spring mounted on the tractor and attached to the rig.

3. A cultivator rig having a cultivator bar and earth-working tools operably attached thereto, means by which the cultivator rig may be drawn, said bar being attached to said means by bearings which permit vertical motion of the bar and rotation thereof, and resilient means to restrict the rotation thereof.

4. A cultivator rig having a cultivator bar and earth-working tools operably attached thereto, means by which the cultivator rig may be drawn, said bar being attached to said means by bearings which permit vertical motion of the bar and rotation thereof, and means to restrict the rotation thereof.

GEORGE R. FOULKE, Jr.

CERTIFICATE OF CORRECTION.

Patent No. 2,345,741.   April 4, 1944.

GEORGE R. FOULKE, JR.

It is hereby certified that error appears in the printed specification of the above numbered patent requiring correction as follows: Page 1, second column, line 4, for "speeed" read --speed--; line 40, for "rig for" read --rig from--; page 2, second column, line 6, for "sped" read --speed--; line 8, for "row" read --rows--; line 28, for "its not" read --is not--; and that the said Letters Patent should be read with this correction therein that the same may conform to the record of the case in the Patent Office.

Signed and sealed this 30th day of May, A. D. 1944.

Leslie Frazer

(Seal)   Acting Commissioner of Patents.